June 20, 1967 T. D. READER 3,326,463

FLUID SHIFT REGISTER

Filed Dec. 4, 1964

INVENTOR.
TREVOR DRAKE READER

BY Thomas P. Murphy

AGENT

United States Patent Office 3,326,463
Patented June 20, 1967

3,326,463
FLUID SHIFT REGISTER

Trevor Drake Reader, King of Prussia, Pa., assignor to Sperry Rand Corporation, New York, N.Y., a corporation of Delaware Filed Dec. 4, 1964, Ser. No. 416,023
9 Claims. (Cl. 235—201)

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to a fluid logic device and more particular to a three state fluid logical element.

The relatively recent discovery that high energy fluid streams can be controlled by means of low energy fluid streams without the aid of moving parts initiated a major research and development effort in this country. Control of high energy fluid streams by low energy fluid streams implies amplification and so the term fluid amplifier was evolved for the fluid devices which performed this function. Other fluid devices were developed in rapid succession which because of their apparent similarities to well known electronic devices are called fluid oscillators, fluid multi-vibrators, fluid AND gates, fluid OR gates, fluid inverter circuits, etc.

The advantages of these fluid devices over the equivalent electronic elements have become well known. For example, fluid devices require no moving parts, are not subject to burn out, are easier and more economical to construct, minimize repairing and replacement and more importantly they are capable of operation under extreme environmental conditions such as temperature, humidity and vibratory motion.

As the fluid amplifier technology advanced complicated circuitry was designed and built which employed only fluid devices. Most of this circuitry functioned exceedingly well and as a result the feasibility of building complicated logical circuitry such as computer systems employing only fluid devices was realized. However, such an undertaking requires the design and construction of many basic logical elements and systems of circuitry.

The present invention contemplates such a logical fluid device. More specifically, the present invention contempates a three state logical fluid element comprising a tristabel fluid amplifier in combination with a fluid NOR circuit. The present invention further contemplates a fluid shift or queueing register employing the three state element of the present invention as its basic component.

The tri-stable element which forms part of the three state element of the present invention is essentially a fluid flip-flop with three stable states. It may be termed a ternary or tri-stable flip-flop as opposed to the conventional binary flip-flop. As a result of this three stable state capability fewer ternary flip-flops are necessary than binary flip-flops to store the same amount of information. A ternary flip-flop costs no more to fabricate and takes up no more space than a binary flip-flop. Therefore, substantial savings in space and cost result from the use of ternary flip-flops rather than binary flip-flops.

The ternary or tri-stable flip-flop more readily lends itself to the use of asynchronous logic because the ternary element is capable of recognizing and indicating three states.

The three state element of the present invention has the capability of storing a binary bit in the form of a high "1" or a high "0" output. If further has the capability of being reset to its empty state so that no output (a low) appears on the "1" and the "0" output terminal or channel. A conventional fluid element, i.e., one employing a binary flip-flop has no empty state and normally has an output on one of its two output terminals unless it is disconnected from its power source. This tri-stable capability makes the present invention highly useful in asynchronous logic circuits which permit higher speeds of operation than equivalent synchronous logic circuits.

The shift or queueing register of the present invention which employs the three state element of the present invention is entirely asynchronous and requires no source of clock pulses to synchronize the shifting of bits. Therefore, it can be loaded at a rate determined only by the switching time of the individual components. This asynchronous capability is made possible by the use of the three state element.

A shift or queueing register using electronic elements is usually more economical to control by means of clock pulses than to add a third state to each cell. Heretofore, the same would be true of a shift register utilizing fluid circuitry.

With this invention such is not the case with fluid circuitry anymore. Since the tri-stable element of the present invention is no more expensive to manufacture than a convention fluid flip-flop, the basic cell of a fluid shift or queueing register employing the tri-stable element is less expensive to make than that of a shift or queueing register which needs to employ a clock to synchronize the shifting of bits. Thus, the shift register of the present invention operates faster and is less costly to make than synchronous registers heretofore available.

Aside from this basic advantage there is an inherent savings in space in the use of the ternary flip-flop in the three state element of the present invention as opposed to the use of a conventional flip-flop. This is so because at least one other component would be required to obtain the three state function.

Therefore, it is an object of the present invention to provide a fluid flip-flop having three stable states.

It is another object of the present invention to provide a fluid flip-flop capable of storing more information than fluid flip-flops heretofore available.

A further object of the present invention is to provide a tri-stable fluid flip-flop which costs no more to fabricate and takes up no more space than bi-stable flip-flops heretofore available.

A still further object of the present invention is to provide a tri-stable flip-flop which when used in fluid circuitry results in substantial savings in costs and space than if conventional bi-stable flip-flops were used.

Another object of the present invention is to provide a three state element capable of storing a binary bit in the form of a high "1" or "0" output which is further capable of being reset to an empty state so that neither its "1" or "0" output channels are high.

A still further object of the present invention is to provide a fluid logical element for use in asynchronous logical circuitry.

A further object of the present invention is to provide an asynchronous fluid shift or queueing register having speed of operation limited only by the speed of operation of its individual components.

A still further object of the present invention is to provide an asynchronous fluid shift register which is at least as cheap to construct as a conventional synchronous fluid shift register but which is substantially faster in operation than a conventional synchronous fluid shift register and which eliminates the need for a source of clock pulses.

Other objects and many of the attendant advantages of the present invention will become more apparent upon the reading of the description taken in connection with the accompanying drawings wherein like reference numerals are used to indicate like parts wherein.

Figure 1:
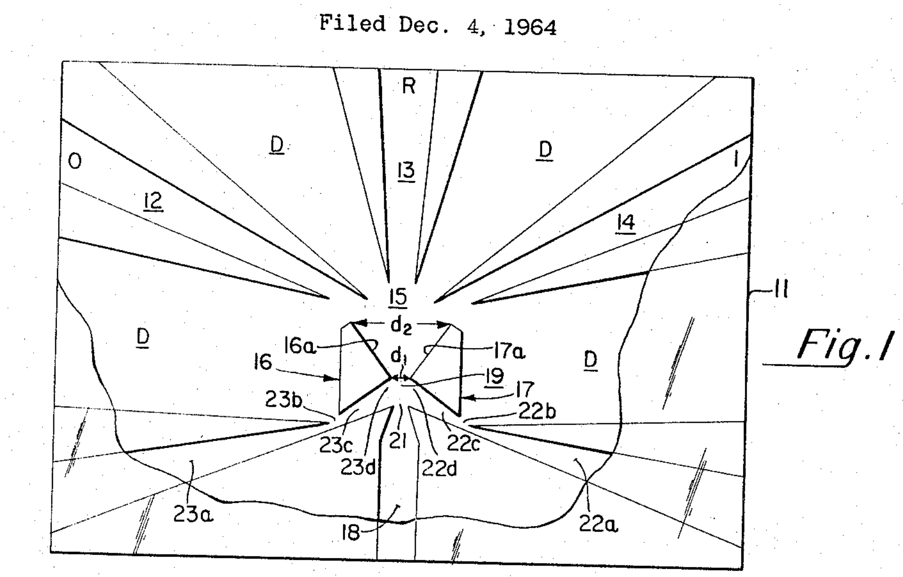
FIGURE 1 illustrates a preferred embodiment of the tristable flip-flop of the present invention.

Referring now more particularly to FIGURE 1 there is shown a preferred embodiment of the tri-stable element 11 hereinafter called tri-stable flip-flop 11 of the present invention. The particular method of fabrication of the tri-stable flip-flop 11 forms no part of this invention and therefore will not be discussed in detail. Suffice it to say that the various channels and passageways may be formed as by machining or molding from a unitary sheet of plastic material which is covered over by another flat sheet of material and fixedly secured thereto.

The tri-stable flip-flop 11 comprises three output channels 12, 13 and 14 which lead from a common area 15 out of the tri-stable flip-flop 11. The common area 15 is partially formed by the walls 16*a* and 17*a* of the triangular shaped wedges 16 and 17 respectively. The walls 16*a* and 17*a* are also the attaching walls to which the power stream adheres as described hereinafter. An input channel 18 leads into interaction chamber 19 via nozzle 21. Nozzle 21 is disposed opposite to and in direct alignment with the output channel 13.

The tri-stable flip-flop 11 comprises control channels 22 and 23 disposed on each side of the nozzle 21. The control channel 22 comprises a first section 22*a* which converges to a narrow neck portion 22*b* which leads into a section 22*c*. The section 22*c* diverges into a relatively wide mouth portion 22*d* adjacent the interaction area 19.

The control channel 23 comprises a first section 23*a* which converges to a narrow neck portion 23*b* leading to a section 23*c*. The section 23*c* diverges into a relatively wide mouth 23*d* adjacent the other side of the interaction area 19.

The passageways indicated by the reference numeral D are all connected in common to a low pressure dump e.g. the atmosphere. Thus, the area in between the output channels 12, 13 and 14 communicate with a low pressure dump as indicated while the areas adjacent the control channels 22 and 23 also communicate with the low pressure region. The narrow neck portions 22*b* and 23*b* of the control channels 22 and 23, respectively, communicate with the adjacent low pressure dumps D. This prevents creation of vacuum condition within sections 22*a* and 23*a* when the power stream is in the output channels 12 and 14, respectively.

When a high pressure source of fluid (not shown) is connected to the input channel 18 and no control signals are present at either control channels 22 or 23, a power stream of fluid is directed out through the output channel 13 via the nozzle 21. When the power stream is in the output channel 13, the tri-stable flip-flop 11 is in the reset stable state. The flip-flop 11 is stable in this condition because of the physical arrangement (alignment) of the output channel 13 and the input channel 18. When a control pressure signal is applied to the control channel 22 while a power stream is in the output channel 13, the power stream is switched to the output channel 12. When the power stream is passing through the output channel 12, the flip-flop 11 is in its second stable state by virtue of power stream attachment to the adjacent wall 16*a* in accordance with the well known boundary layer phenomena.

If a pressure pulse is applied to the control channel 23 while the power stream is in the output channel 13, the power stream is switched to the output channel 14 where the power stream becomes attached to the wall 17*a*. The flip-flop 11 is in its third stable state.

For purposes of convention the flip-flop 11 is said to be in the "0" state when the power stream is in the output channel 12. When the power stream is in the output channel 13, this is designated the reset or "R" state of the flip-flop 11. When the power stream is in the output channel 14, the flip-flop is in the "1" state.

If pulses of just sufficient magnitude to switch the power stream from the output channel 13 to the output channels 12 or 14 are applied to the control channels 22 or 23, respectively, the same magnitude pulses will be ineffective to switch from the output channel 14 to the output channel 13 or from the output channel 12 to the output channel 13. This is so because in the latter case the control pulses have to overcome the wall attachment force whereas when the power stream is being switched from the output channel 13 to either one of the output channel 12 or 14 no wall attachment force must be overcome because there is no wall attachment associated with the output channel 13. Thus, when control pulses below a predetermined magnitude are used the output channel 13 is the only one from which the power stream may be switched.

When the power stream is in either the output channel 12 or the output channel 14, one way to switch or get the power stream back into the output channel 13 is by termination of the power source and its reinitiation in the absence of any control pulses.

Of course, if pulses of a large enough magnitude were used, the power stream might be switched from the output channel 14 to the output channel 12 or back again regardless of the strength of the wall attachment. Furthermore, if pulses of precisely the right magnitude were selected and the tri-stable flip-flop 11 were so designed, the power stream could be switched from the output channel 14 to the output channel 13 or from the output channel 12 to the output channel 13.

The tri-stable flip flop 11 employs jet reaction rather than momentum exchange to effectuate switching of the power stream. The control channels are so designed to provide this jet reaction type of switching which is in effect the application of substantially static pressure across the power stream on one side of the power stream. Thus, when a pressure differential appears across the power stream the power stream switches in the direction of low pressure.

This method of introducing a control signal allowing the static pressure of the control signal to act on one side of the power jet causes more rapid switching than the momentum type switching and is therefore more effective.

The control channels 22 and 23 are constructed to provide jet reaction or static switching. For example, when a source of control pressure is connected momentarily to the control channel 22, the converging section 22*a* creates a distinct dynamic pulse in neck portion 22*b*. The fluid in this pulse is collected in the diverging section 22*c* where it is diffused into a static pulse, i.e., the pressure within section 22*c* rises rapidly. Since no control is being applied to the control channel 23, the pressure in section 23*c* is relatively low because neck portion 23*b* communicates with the atmosphere. Now if a power stream is present in the output channel 13 when the pressure in section 22*c* is raised, the power stream is switched to the output channel 12. Of course, switching to the output channel 14 involves a similar function of the control channel 23. When the power stream is switched by virtue of a relatively high static pressure in the section 22*c* some of the control air is permitted to accelerate along a path parallel to the power stream.

Figure 3:
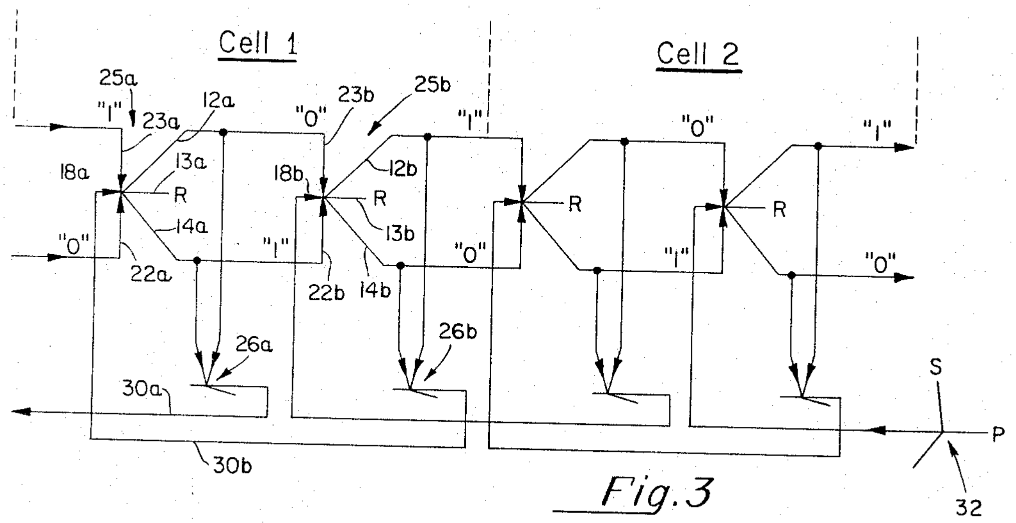
FIGURE 3 illustrates a preferred embodiment of the fluid shift register of the present invention.

The power source (not shown) may be connected to the input channel 18 through a fluid inverter of any well known type such as fluid inverter 32 shown in FIG. 3 so that a control pulse applied to the control channel of the fluid inverter terminates the power stream for a period equal to the duration of the pulse applied to the control channel of the fluid inverter.

The dimensions of the tri-stable element 11 are quite critical. The shortest distance between the wedges 16 and 17 is *d*1 which is equal to 0.032 inch and the longest distance is *d*2 which is equal to 0.304 inch.

The ratio of distance $d2$ to $d1$ defines the angle which walls **17*a* and 16*a*** make with the vertical. This ratio is 9.5 to 1.

The walls **16*a* and 17*a*** each have a length equal to 0.224 inch.

The nozzle 21 has a width equal to 0.024 inch. The small entrance to chamber **22*c* and 23*c* are of widths equal to 0.130 inch. The lengths of the walls of wedges 16 and 17 which form diffuser chambers 22*c* and 23*c*** equal 0.20 inch.

All of the foregoing dimensions are relative, i.e., if one is changed in dimension, the others must be changed for conformity. The dimensions may vary ±3 percent without affecting the operability of the element.

The tri-stable element was designed to operate with an input power fluid at channel 18 of a pressure equal to 20 cm. of water but this is not critical. The pressure of the input fluid may have a value between 15 and 50 cm. of water without seriously affecting operation of the element 11. The pressure of the control fluid at the control inputs need be only a few centimeters of water less than the power input.

Figure 2:
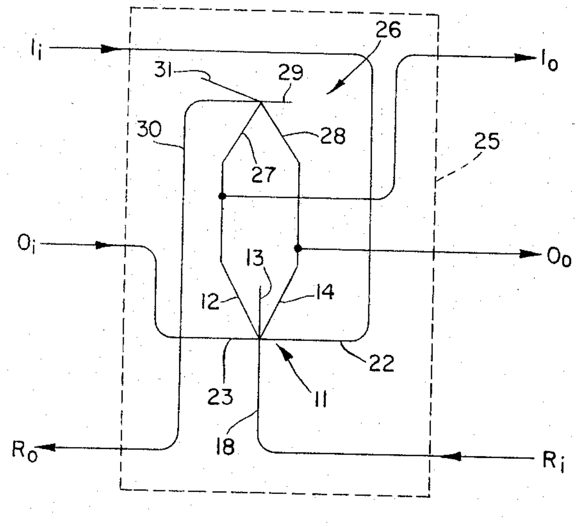
FIGURE 2 illustrates in schematic form the three state element of the present invention.

Referring now more particularly to FIGURE 2 there is shown a preferred embodiment of the three state element 25 of the present invention. The three state element 25 of the present invention comprises a tri-stable flip-flop 11 identical to the one discusesd above in combination with a NOR circuit 26.

In this embodiment the output channel 13 leads to the low pressure dump, for example, the atmosphere. The output channels 12 and 14 of flip-flop 11 are connected to the control channels 27 and 28 of the NOR gate 26, respectively.

The NOR gate 26 itself comprises an input channel 29, output channels 30 and 31 and the control channels 27 and 28. A source of fluid (not shown) is connected to the input channel 29.

In its normal state the power stream of the fluid passes directly through the input channel 29 and out the output channel 30. A control pulse on either of the control channels 27 and 28 diverts the power stream to the output channel 31 for the duration of the control pulse. The output channel 31 leads to a low pressure dump, for example, the atmosphere.

The three state element 25 has three output channels indicated by reference numerals $\mathbf{1}_0$, $\mathbf{0}_0$ and $R_0$. The output channels $\mathbf{1}_0$ and $\mathbf{0}_0$ are connected to the output channels 12 and 14 of the tri-stable flip-flop 11, respectively. The output channel $R_0$ is an extension of the otuput channel 30 of the NOR gate 26. The three state element 25 has three inputs (not counting the power input to the NOR gate 26) $R_i$, $\mathbf{0}_i$ and $\mathbf{1}_i$. $R_i$ is connected to the input channel 18 of the tri-stable flip-flop 11. The input channels $\mathbf{1}_i$ and $\mathbf{0}_i$ are respectively connected to the control channels 22 and 23 of the tri-stable flip-flop 11.

The operation of the three state element 25 may be best understood first by setting forth the logical rules under which it operates. There are:

(1) Only one output can be on at any given instant.

(2) One of the three outputs must always be on.

(3) If the input signal $R_1$ is on then any one of the output signals can be on depending on the previous condition of the two other input signals.

(4) If $R_i$ is turned on while $\mathbf{0}_i$ or $\mathbf{1}_i$ inputs are off then $R_0$ will stay on.

(5) A pulse applied to the $\mathbf{1}_i$ input while $R_0$ is on will turn on the $\mathbf{1}_0$ output and simultaneously turn off $R_0$. Similarly, a pulse applied to the $\mathbf{0}_i$ input while $R_0$ is on will turn on the $\mathbf{0}_0$ output and simultaneously turn off $R_0$.

(6) If $R_i$ is turned on while the $\mathbf{1}_i$ input is on, the $\mathbf{1}_0$ output will immediately turn on and $R_0$ will turn off.

(7) If $R_i$ is off, $R_0$ will be on irrespective of the conditions of the inputs $\mathbf{1}_i$ and $\mathbf{0}_i$.

(8) If $R_0$ is off, the state of the outputs $\mathbf{1}_0$ and $\mathbf{0}_0$ cannot be changed by means of signals applied to either input $\mathbf{1}_i$ or $\mathbf{0}_i$ but can only be changed by pulsing off $R_i$.

In operation the three state element 25 functions substantially as follows. Normally fluid is continuously supplied to the input channel $R_i$. When the signal to the input channel $R_i$ is high in the absence of control signals at the input channels $\mathbf{1}_i$ or $\mathbf{0}_i$, the power stream passes through the output channel 13 into the atmosphere and the outputs at the output channels $\mathbf{1}_0$ and $\mathbf{0}_0$ remain low.

If the input at the input channels $\mathbf{1}_i$ or $\mathbf{0}_i$ goes high while the input at the input channel $R_i$ remains high, the corresponding one of the output channels $\mathbf{1}_0$ or $\mathbf{0}_0$ will have a high. Since the output channels $\mathbf{1}_0$ and $\mathbf{0}_0$ are connected to the input channels 27 and 28 of the NOR circuit 26, the output channel $R_0$ which normally has a high will go low if either of the output channels $\mathbf{0}_0$ or $\mathbf{1}_0$ has a high.

FIGURE 3 illustrates the fluid shift register of the present invention. It is shown as comprising two memory cells 1 and 2, but it should be understood that it may comprise a larger number of memory cells depending on the amount of information to be stored. Each of the cells 1 and 2 of the fluid shift register comprises two three state elements identical to the three state element 25 described in connection with FIGURE 2. The first three state element **25*a* constitutes the input stage of the cell 1 while the second three state element 25*b* constitute the output stage of the cell 1. The three state elements 25*a* and 25*b*** are connected substantially as follows.

The output channels **12*a* and 14*a* are connected to the input channels 23*b* and 22*b*, respectively. The output channel 30*b* of the NOR circuit 26*b* is connected to the input channel 18*a*. The output channel 30*a* of the NOR circuit 26*a*** would be connected to the input channel of the output stage of any previous cell which in this case is not used.

The two three state elements of the cell 2 are connected together in a manner identical to that described with respect to the cell 1. The output channel of the NOR circuit of the input stage of the cell 2 is connected to the input channel **18*b* of the output stage of the cell 1. The output channel of the NOR circuit of the output stage of the cell 2 is connected to the input channel of the input stage of the cell 2. The output stage of the cell 1 is connected to the input stage of the cell 2** in the same manner that input stage and output stage of each cell are interconnected.

The fluid shift register accepts information presented to it serially in the form of pulses applied to the control channels **22*a* or 23*a* which in FIGURE 3 effectively serve as input channels. The shift register stores the information so that it may be read either in parallel or serially. When being read out serially, the information is unloaded from its output end one bit at a time. A shift signal is applied to channel S as each bit of information is read and the whole word drops one place. This procedure continues until the last bit in the word has been read and the register is empty. A new word may be then read into it serially. As each bit is presented to the input end of the register, it drops to the last empty space nearest to the output end. The shift register shown is capable of storing two bits—one bit for each cell. The shift register can store as many bits as there are memory cells. It is to be understood that only two cells are shown for convenience in explanation and that a shift register according to the present invention would in practice comprise a plurality of cells dependent on the amount of information desired to be stored. Although reference numerals are used to describe the interconnections of the stages of cell 1, the operation of the fluid shift register is best understood in terms of the output states "0" "R" and "1" as well as the inputs 22*a* and 23*a*** and the terminal S over which shift pulses are applied.

The fluid shift register is initially empty, i.e. all of the outputs 1 and 0 are off while the outputs R which dump into a low pressure regions are on.

When a pulse (a bit) is applied to channel 22*a* or 23*a*, the input stage (three state element 25*a*) of cell 1 is switched to its "0" or "1" state. This causes the output stage (three state element 25*b* to be switched to its "0" or "1" state. This ultimately causes the output stage of cell 2 to be switched to its "1" or "0" state. The NOR circuit of the output stage responds to the "1" or "0" state to remove power from the power input channel of the input stage of cell 2. Cell 2 is now filled and cannot accept any more bits. Cell 1, however, is ready to accept a bit.

Thus, when a second pulse is applied to channels 22*a* or 23*a*, the output stage of cell 1 is switched to its "1" or "0" state. This, switches the NOR circuit of the output stage of cell 1 to remove power from the input stage of cell 1, making it impossible for cell 1 to accept any more bits for storage.

Reading of the bits stored in the shift register is accomplished at the output stage of the last cell which in this case is cell 2. The particular means of read out is not a part of this invention and is not herein discussed. It may, for example, be accomplished by a pressure to electrical signal transducer directly connected to an information utilization means.

In any event as each bit is read, a shift pulse is applied to the control channel S of a fluid inverter circuit 32 which causes power to be removed from the power input of the output stage of the cell 2 for the duration of the shift pulse.

When this occurs, power is reinitiated at the power input of the input stage of cell 2 causing the input stage of cell 2 to accept the bit present in the output stage of cell 1. When the shift pulse terminates, the bit is passed on to the output stage of cell 2. At this time cell 2 has a bit ready to be read and cell 1 has none.

If, however, the cell previous to cell 1 had a bit of information stored, the application of the above-mentioned shift pulse would cause it to be transferred to the input stage of the cell 1 during existence of the shift pulse and then to the output stage of the cell 1 on termination of the shift pulse.

When the shift register is loaded, i.e., a bit in each output stage of each cell (regardless of the number of cells), the application of each shift pulse removes the bit from the output stage of the last cell. It also causes each bit to move over one cell. When a number of shift pulses equal to the number of bits stored in the shift register are applied, the shift register becomes completely empty and ready for the next word.

The embodiments of the invention in which an exclusive property or privilege is claimed are defined as follows:

1. A fluid shift register comprising, a plurality of tri-stable fluid amplifier elements connected in cascade, each of said elements comprising a power input channel, two control channels and three output channels, the first of said output channels being aligned with said power input channel and adapted to receive a power jet from said input channel when neither of said control channels are energized, each of said tri-stable amplifiers being operative so that a fluid control signal applied to either of said control channels will switch the power jet from said power input channel to either the second or third ouptut channel in dependence upon which control channel is energized, means coupling the second and third output channels of each amplifier to respective control channels of the next higher order stage in the cascade, a separate fluid switching element inserted in the power input channel of each of said tri-stable amplifiers, each of said fluid switching element having a control input which when subjected to a fluid pressure signal will act to interrupt the flow of fluid through the power input channel of the associated tri-stable amplifier, and means coupling the second and third output channels of each tri-stable amplifier to the control input of the fluid switching element of the immediately preceding stage of the cascade.

2. A shift register, comprising in combination: a plurality of three state logical elements, each of said logical elements comprising, a first logical device having first, second and third output terminals, first and second control terminals and a power input terminal normally providing power to said second output terminal only in the absence of control signals on said first and second control terminals, a second logical device having first and second output terminals, a control terminal and a power input terminal normally providing power to said first output terminal when no signal is present on said control terminal, means connecting said first and third output terminals of said first logical device to said control terminal of said second logical device to cause power to be switched to said second output terminal of said second logical device when a signal is present on either of said first or second control terminals of said first logical device, conductor means connecting said first and third output terminals of said first logical device of each of said logical elements, respectively, to said first and second control terminals of said first logical device of the next adjacent one of said logical elements, conductor means connecting said power input terminal of said first logical device of each of said logical elements to said first output terminal of said second logical device of the next adjacent one of said logical elements.

3. A shift register, comprising in combination: a plurality of cascaded three state logical elements, each of said logical elements comprising, a logical device having first, second and third output terminals, a power input terminal, first and second control terminals, means normally providing said third output terminal with a signal, means responsive to a signal on said first or second control terminal to provide a signal on said first or second output terminal, respectively, only when said power input terminal is energized, means responsive to signals on either of said first or second output terminals to remove said signal from said third output terminal, conductor means connecting said first and second output terminals of each of said logical elements, respectively, to said first and second control terminals of the adjacent logical element, conductor means connecting said power input terminal of each of said logical elements to said third output terminal of the adjacent logical element.

4. A fluid shift register, comprising in combination: a plurality of memory cells in cascaded arrangement, each of said memory cells comprising an input stage and an output stage, each of said stages comprising, a three state fluid logical element including a tri-stable fluid amplifier having an interaction chamber, an input channel connected to said interaction chamber adapted to provide a fluid stream therein, first and second control channels, first, second and third output channels leading from said interaction chamber, said second output channel and said input channel being disposed in alignment with each other, means associated with each of first and third output channels exhibiting the boundary layer effect when a fluid stream is passing through said first or third output channel; a NOR circuit for each tristable fluid amplifier having first and second output channels, first and second control channels and a power input channel in alignment with said first output channel, fluid conductor means connecting said first and third output channels, of each tri-stable fluid amplifier to said first and second control channels of the respective NOR circuits, fluid conductor means connecting said first and third output channels of the tri-stable amplifier of each of said input stages, respectively, to the first and second control channels of the tri-stable amplifier of the associated output stages, fluid conductor means connecting said input channel of the tri-stable amplifier of each of said input stages to the first output channel of the NOR circuit of the associated output stages; fluid conductor means connecting said first and third output channels of the tri-stable amplifier of each of said output stages, respectively, to the first and second control channels of the tri-stable amplifier of the input stage of the adjacent memory cell, fluid conductor means connecting said input channel of the tri-stable amplifier of each of said output stages to the first output channel of the NOR circuit of the input stage of the adjacent memory cell.

5. A fluid logic element comprising, a fluid interaction chamber, a fluid power nozzle located at one end of said chamber and adapted when a fluid pressure is applied thereto to project a fluid power stream through said interaction chamber, a first fluid receiver channel located downstream from said power nozzle and in line therewith, second and third fluid receiver channels located on opposite sides of said first receiver channel, first and second control orifices disposed adjacent said power nozzle and on opposite sides thereof, a first venting passageway interposed between said first and second receiver channels and a second venting passageway interposed between said first and third receiver channels.

6. A fluid logic element according to claim 5 wherein there is further included a third venting passageway located between the second receiver channel and a first one of said control orifices and a fourth venting passageway located between the third receiver channel and the other of said control orifices.

7. A fluid logic element according to claim 5 wherein there is further included a pair of spaced apart boundary layer control blocks disposed on opposite sides of said power nozzle, and spaced downstream from said power nozzle and upstream from said first and third receiver channels.

8. A fluid logic element according to claim 7 wherein the boundary layer control blocks are wedge shaped and wherein the apexes of the wedge-shaped blocks are in spaced apart confronting relationship to provide a throat portion through which the power jet passes and further wherein the downstream surfaces of said blocks are divergent to provide boundary layer control of the power jet when it is deflected to either the second or third receiver channels.

9. A fluid logic element according to claim 6 wherein there is further included a pair of spaced apart boundary layer control blocks disposed on opposite sides of said power jet nozzle in the area of the third and fourth venting passageways respectively, and wherein said blocks are spaced downstream from said power nozzle and upstream from said third and fourth receiver channels.

References Cited

UNITED STATES PATENTS

| | | | |
|---|---|---|---|
| 3,016,063 | 1/1962 | Hausmann | 137—81.5 |
| 3,124,999 | 3/1964 | Woodward | 91—3 |
| 3,128,040 | 4/1964 | Norwood | 235—201 |
| 3,159,169 | 12/1964 | Reader | 235—201 X |
| 3,181,545 | 5/1965 | Murphy | 137—81.5 |
| 3,201,041 | 7/1965 | Welsh | 235—201 |
| 3,238,958 | 3/1966 | Warren et al. | 137—81.5 |
| 3,240,221 | 3/1966 | Pan | 137—81.5 |

OTHER REFERENCES

Mitchell et al.: "Fluid Logic Devices and Circuits," Abstracted from Transactions of the Society of Instrument Technology. Feb. 26, 1963, pp. 1–14.

Robbs: "9 Logic Elements," Fluid Amplification Symposium, U.S. Army Command, Harry Diamond Laboratories. TP 156 F65 U 5 f C. 3 Mar. 8, 1963, pp. 5–20.

Taft and Wilson: "A Fluid Encoding System," Proceedings of the Fluid Amplification Symposium, Harry Diamond Laboratories, May 1964, volume IV, p. 98.

Grubb: (1) "Fluid Binary Full-Adder, IBM Technical Disclosure Bulletin, vol. 6, No. 1, June 1963, p. 29.

Grubb: (2), "Fluid Logic Shift Register—," IBM technical disclosure bulletin, volume 6, No. 1, June 1963, p. 24.

Mitchell: "Two Jet Logic Using Walls," IBM technical disclosure bulletin, volume 6, No. 5, October 1963, p. 17.

RICHARD B. WILKINSON, *Primary Examiner.*

LOUIS J. CAPOZI, W. F. BAUER, L. R. FRANKLIN, *Assistant Examiners.*